US011036707B2

(12) United States Patent
Stewart et al.

(10) Patent No.: US 11,036,707 B2
(45) Date of Patent: Jun. 15, 2021

(54) AGGREGATE, INDEX-BASED, REAL-TIME VERIFICATION OF NODE CONTENTS

(71) Applicant: McAfee, LLC, Santa Clara, CA (US)

(72) Inventors: Brian Stewart, Santa Clara, CA (US); Howard D. Stewart, Idaho Falls, ID (US); Seth Grover, Santa Clara, CA (US); Brian Rhees, Santa Clara, CA (US); Pablo Michelis, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 208 days.

(21) Appl. No.: 15/912,293

(22) Filed: Mar. 5, 2018

(65) Prior Publication Data

US 2019/0272337 A1  Sep. 5, 2019

Related U.S. Application Data

(60) Provisional application No. 62/468,836, filed on Mar. 8, 2017.

(51) Int. Cl.
*G06F 17/00* (2019.01)
*G06F 7/00* (2006.01)
(Continued)

(52) U.S. Cl.
CPC ...... *G06F 16/2272* (2019.01); *G06F 16/2246* (2019.01); *G06F 16/2282* (2019.01); *G06F 16/2365* (2019.01)

(58) Field of Classification Search
CPC .............. G06F 16/2272; G06F 16/2246; G06F 16/2282; G06F 16/2365
(Continued)

(56) References Cited

U.S. PATENT DOCUMENTS 6,247,099 B1 * 6/2001 Skazinski ........... G06F 12/0815
711/117
7,702,640 B1   4/2010 Vermeulen et al.
(Continued)

OTHER PUBLICATIONS

International Searching Authority, "Search Report and Written Opinion," issued in connection with PCT patent application No. PCT/US2018/020961, dated May 7, 2018, 16 pages.
(Continued)

*Primary Examiner* — Pavan Mamillapalli
(74) *Attorney, Agent, or Firm* — Hanley, Flight & Zimmerman, LLC

(57) ABSTRACT

According to some embodiments, so-called "NS-Tree" indexes may be used to calculate whether all (or a portion) of two independent tables are consistent. The NS-Tree indexes may be comprised of various elements, e.g., a synchronization time, a primary key, a hash of the complete record itself, and an aggregate value associated with each index entry (e.g., an accumulated XOR value). At any point in the index, an entry may possess the accumulated aggregate value of all key entries in the table up to that point. That aggregate value may be used to validate data consistency with another table(s) maintaining the same index. Due to the unique composition of the NS-Tree index, users can also validate two data sets within a 'sub-range' of the entire data set. According to other embodiments, NS-Tree indexes may also be applied to two different clusters of nodes by applying the NS-Trees at a 'federated' level.

19 Claims, 6 Drawing Sheets

(51) Int. Cl.
*G06F 16/22* (2019.01)
*G06F 16/23* (2019.01)
(58) Field of Classification Search
USPC .......................................................... 707/696
See application file for complete search history.

(56) References Cited

U.S. PATENT DOCUMENTS

| | | | | |
|---|---|---|---|---|
| 10,223,394 | B1* | 3/2019 | Kelm | .................. G06F 16/2246 |
| 2010/0309933 | A1* | 12/2010 | Stark | .................. G06F 16/2246 |
| | | | | 370/503 |

OTHER PUBLICATIONS

International Bureau, "International Preliminary Report on Patentability," issued in connection with International Patent Application No. PCT/US2018/020961 dated Sep. 10, 2019, 10 pages.

* cited by examiner

AGGREGATE, INDEX-BASED, REAL-TIME VERIFICATION OF NODE CONTENTS

CROSS-REFERENCE TO RELATED APPLICATIONS

This application claims priority to U.S. Provisional Patent Application Ser. No. 62/468,836, filed Mar. 8, 2017, and entitled, "Aggregate, Index-Based, Real-Time Verification of Node Contents" ("the '836 application). The '836 application is also hereby incorporated by reference in its entirety.

TECHNICAL FIELD

Embodiments described herein generally relate to data access and data manipulation systems and methods, and particularly to those that utilize enhanced indexing methods.

BACKGROUND

Web server applications are increasingly being used to provide users with access to data stored in databases over the Internet using web browsers. These web server applications respond to incoming user requests by providing concurrent threads of execution, each of which responds to an individual request, while maintaining per-user web server application access to information. These requests often require different types of searches, calculations, or modifications of data stored in large databases.

As a result of this environment, database oriented web server applications are required to logically maintain numbers of large result sets, and to be able to perform multiple types of calculations or insertions with high efficiency to maintain a reasonable performance level for the users.

Database designs have addressed the demand for increasing the performance of database operations, specifically searches and queries, by introducing indexes (also called inverted indexes). Each index may be defined and exist within the context of a table in the database. Most indexes are optional, and may be created by the user to enhance the speed of one or more queries performed on the table. The user can define more than one index for the same table, e.g., basing the indexes on different fields defined in the table. When the user defines an index based on a field in the table, the user is requesting the database to create a separate sorted list of all values of that field in that table, with a link from each value to the location of the corresponding record in the table. Thus, the database concept of an index is similar to the concept of indexes used, for example, in books.

Indexes are usually sorted in specific balanced tree structures of linked records to facilitate the search mechanism. While creating a new index for a table adds the benefit of efficiency and higher performance for specific queries that the index is designed for, it can also introduce costs. One cost is due to extra space needed to store the index tree. This storage space has to be allocated in addition to the space needed to store the records of the table and corresponding metadata. Another cost that may be incurred is in terms of performance. When a record (e.g., a row) is inserted into or deleted from a table, a corresponding record must be inserted into or deleted from each index list defined for that table. Alternatively, when the value of an indexed field is altered for a record in the table, a corresponding record must be altered in the index, which means the database engine must delete the index record from one location in the sorted index list and insert the new record into another location. Since each index list is a sorted structure, often in the form of a tree, these additions or deletions may require a rebalancing of the index structure. Thus, while creating a new index improves the performance of specific queries for which it is designed, it might degrade the performance of other database operations, specifically the performance of insertion, modification and deletion operations. This extra cost may be significant for databases where there are many updates in the records and/or when it is important that records remain synchronized across a number of different nodes and/or different independent clusters of nodes.

In distributed/scaled data management solutions in particular (also referred to as "Big Data" or "Big Data Analytics"), it may be desirable to ensure data integrity between nodes, regardless of the presumed assurance of eventual consistency through data insertion. Due to, e.g., hardware issues, network issues, or any number of other potential failure points, independent 'replicated' nodes may become out of synchronization and need to be regularly checked for consistency. With potentially multiple billions of records replicated across N nodes containing data produced through, e.g., web servers, user devices, and/or IoT devices, the cost of maintaining commonly used algorithms such as hash trees (e.g., Merkle Trees, Tiger tree hashes, etc.) in real-time may begin to negatively impact the available system resources on the individual nodes.

Traditional hash trees are typically pre-constructed and accompany packages of data (i.e., data structures) that are to be used to validate said data packages in peer-to-peer networks. However, as systems continue to scale and become ever more large and complex, it is essential to have a lightweight consistency verification algorithm that is built to scale across the data "shards" (i.e., a server that acts as the single source for a subset of the data stored in the database) and nodes of a distributed data management solution and maintain the ability to validate consistency at any given moment and across any range of time—a capability that is not possible with other traditional solutions. In addition to 'single cluster, node-to-node' consistency checking capabilities, the techniques described herein also may be used to solve an industry problem of being able check the consistency of two independent clusters of nodes using the same methodology.

DESCRIPTION OF EMBODIMENTS

Figure 1:
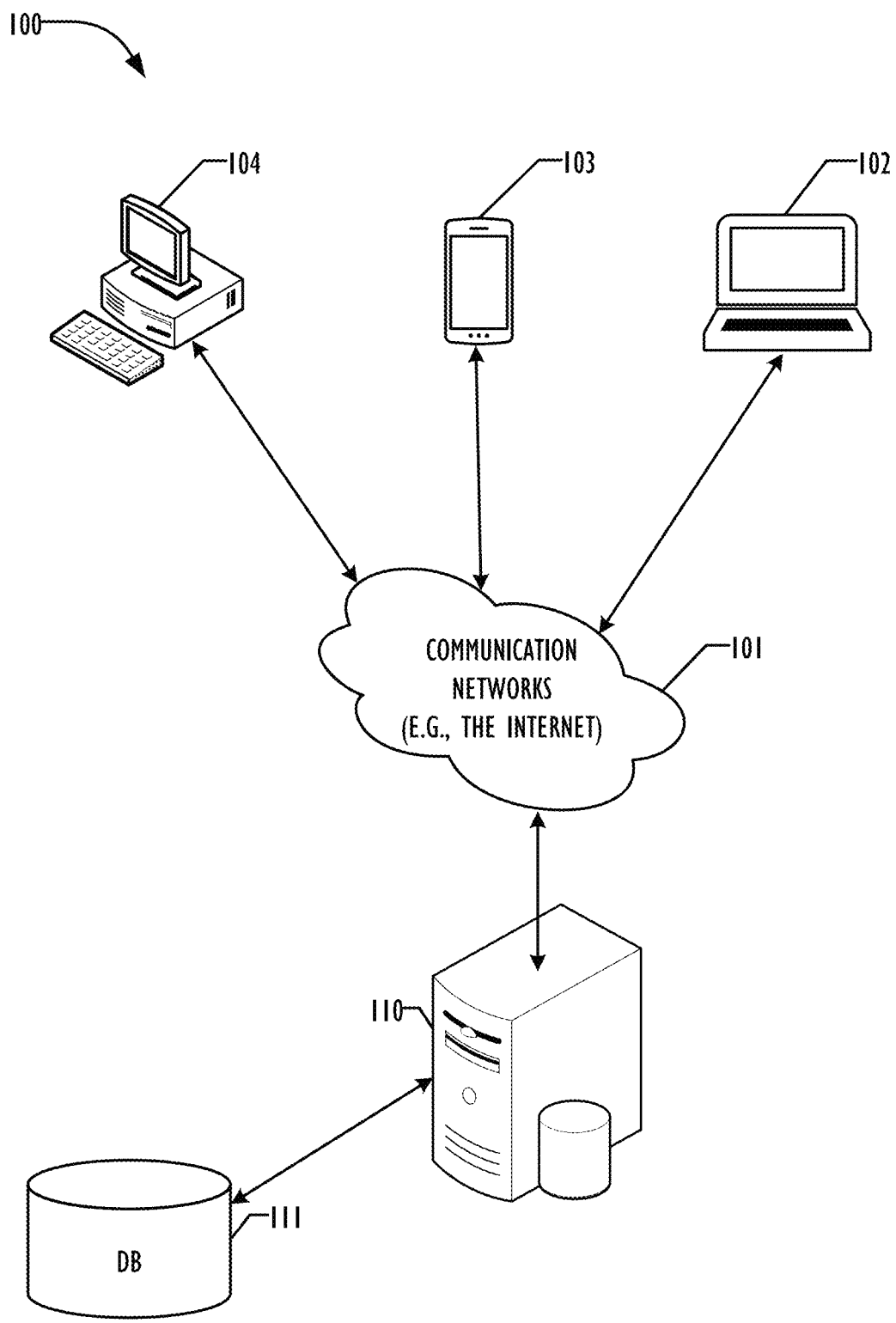
FIG. 1 is a pictorial diagram of an Internet-based web server system comprising a single node, according to one or more embodiments disclosed herein.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been selected principally for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The embodiments described herein are examples and for illustrative purposes. Persons of ordinary skill in the art will recognize that alternative techniques for implementing the disclosed subject matter may be used. Elements of example embodiments may be arranged in different arrangements or combined with elements of different example embodiments. For example, the order of execution of blocks and flow charts may be changed. Some of the blocks of those flowcharts may be changed, eliminated, or combined and other blocks may be added as desired.

As used herein, the term "programmable device" and its variations refer to a physical object that includes electronic components configured to receive, transmit, and/or process data information. For one embodiment, one or more of the electronic components may be embedded within the physical object, such as in wearable devices and mobile devices (e.g., self-driving vehicles). For one embodiment, the device may also include actuators, motors, control functions, sensors, and/or other components to perform one or more tasks without human intervention, such as drones, self-driving vehicles, and/or automated transporters. The programmable device can refer to a computing device, such as (but not limited to) a mobile computing device, a lap top computer, a wearable computing device, a network device, an internet of things (IoT) device, a cloud computing device, a vehicle, a smart lock, etc.

As used herein, the terms a "program," a "computer program," an "application," and their variations refer to one or more computer instructions that are executed by a programmable device to perform a task. Examples include, but are not limited to, software and firmware.

As used herein, the term "communication network" and its variations refer to communication technology that enables a collection of interconnected programmable devices to exchange data with each other. Examples of communication networks include, but are not limited to, any type of data or communication network such as a local area network (LAN), a wide area network (WAN) such as the Internet, a fiber network, a storage network, or a combination thereof, wired or wireless. The communication network(s) also include networking hardware (e.g., switches, gateways, routers, network bridges, modems, wireless access points, networking cables, line drivers, switches, hubs, repeaters, etc.).

As used herein, the term "a computer system" can refer to a single computer or a plurality of computers working together to perform the function described as being performed on or by a computer system.

Typical methods for determining data consistency between tables include variations of hash tables or hash trees. While such solutions may be effective in determining data inconsistencies, they often require additional processes and/or resources that are not provided by the indexing techniques of the data management system that the solutions are being employed in. In addition, the recalculation of such hash trees, e.g., due to reconstruction or record insertion/modification, can impose a large cost, depending on the size of the data structures being hashed. Once such hash trees are constructed, the root node is used to determine if two data sets are consistent—both in terms of data content and position within the data structure. A user, therefore, can only determine if an entire data set is consistent and, if a dataset is found to be inconsistent, the user must perform a table scan to determine where the inconsistency is.

Various indexing solutions have been proposed for use in node consistency checking, e.g., those disclosed in U.S. Pat. No. 6,480,839 ("the '839 patent"), U.S. Pat. No. 8,412,713 ("the '713 patent"), and U.S. Publ. No. 2010/0198830 ("the '830 publication"), each of which is hereby incorporated by reference in its entirety. Such solutions may allow for aggregate calculations regardless of the number of records stored in the database. Such indexes are also referred to herein as "Nitro Trees" or "N-Trees." These aggregates may be maintained in real-time as records are inserted, deleted, and/or modified. Building on those technologies, the techniques described herein are able to create improved specific, real-time indexes that allow for immediate determination as to whether or not two tables or relations within a single table schema are synchronized, i.e., consistent, at any point in time (or across any range of time). Such improved synchronization indexes are also referred to herein as "NitroSync Trees" or "NS-Trees."

According to some embodiments disclosed herein, with these unique NS-Tree indexes, a user or system may quickly calculate whether all or a portion of two independent tables are consistent, i.e., in terms of the data stored within the tables. For example, the system may maintain an NS-Tree index for each of the two independent tables. Each index element of the NS-Tree indexes described herein may be comprised of various elements, e.g., a synchronization time (i.e., "sync time"), a primary key, a hash of the complete record itself, and an aggregate value associated with each index entry (e.g., an accumulated XOR value). Thus, each index entry may possess the accumulated aggregate value of all prior index entries in the points-Tree index. An aggregate value of an index entry of one of the NS-Trees may then be compared to an aggregate value of an index entry of the other NS-Tree to validate data consistency between the two independent tables Among the advantages of NS-Trees is the fact that they can be queried and validated very rapidly. NS-Trees may also be maintained in real-time and auto-adjusted with every record insertion, deletion and/or modification. Further, there is no need for separate hashing algorithms or processes, as NS-Trees may be maintained through the natural indexing techniques of the database that the data is being stored in. NS-Trees also carry the added benefits of sub-tree comparison capabilities. In other words, due to the unique composition of the NS-Tree index, users can validate two data sets within a 'sub-range' of the entire data set (e.g., based on a specified time range) or over the entire data set. NS-Trees also obviate the need for performing a tree scan operation, and the results of any sub range may be returned nearly instantaneously. Consistency between nodes may also be validated through relative record position instead of absolute record position, as in hash trees. This provides the added flexibility to be able to perform consistency verification on a subset of data of two different tables.

According to other embodiments disclosed herein, NS-Tree indexes may also be applied to two entirely different (i.e., independent) clusters of nodes in potentially different data centers by taking the concepts and applying them at a 'federated' level to validate the consistency of two entirely separate clusters of nodes. Existing technologies do not have this capability and cannot achieve the desired outcome as quickly and efficiently as the cluster-level NS-Trees described herein.

FIG. 1 is a pictorial diagram of an Internet-based web server system 100 comprising a single node, according to one or more embodiments disclosed herein. The database 111 at the single node may be accessed by one or more users using web browsers executing within programmable devices 102-104 and communicating with web server 110 over a communication network 101, e.g., the Internet. In this embodiment, the client computer 104, for example, uses a web browser to communicate using the HTTP communications protocol to send a URL, which includes requesting information across communication network 101 to web server 110. The request information included within the URL typically specifies a database request. The web server 110 may, in turn, process the URL to obtain the database request information to be supplied to the database 111, resulting in the invocation of the database request specified by the user.

When a database request is complete, web server 110 may generate an HTML representation of a web page (or other document) that has data, e.g., data corresponding to a result set, which was generated when the database request was applied to database 111. The exemplary HTML representation of the web page may then be transmitted back across the communication network 101 to client computer 104 for display to a user using the web browser. This process of sending a database request, generating the results, generating the HTML web page representation of the results, and returning the representation to the user may occur each time a programmable device 102-104, communicates over the Internet to web server 110.

Each of the programmable devices 102-104 can be an internet of things (IoT) device, a mobile computing device, or a cloud computing device. Also, one or more of the devices 102-104 can include one or more electronic components. Examples of such components include: processing unit(s) (such as microprocessors, co-processors, other types of integrated circuits (ICs), etc.); corresponding memory; and/or other related circuitry. For one embodiment, and as shown in FIG. 1, at least one of the devices 102-104 can include an input device for capturing user inputs and data. One or more of the devices 102-104 can also include sensors for capturing data indicative of one or more environs. Additionally, one or more of the devices 102-104 can include an output device for presenting a user interface (e.g., a graphical user interface (GUI), any other type of user interface, etc.) to enable any of the other operations described herein.

The web server 110 includes one or more electronic components. Examples of these component(s) include: processing unit(s) (such as microprocessors, co-processors, other types of integrated circuits (ICs), etc.); corresponding memory (volatile memory, additional non-volatile memory, etc.); and/or other related circuitry. As such, the web server 110 can be any of various types of computers, including general-purpose computers, workstations, personal computers, servers, etc. In some embodiments, the web server 110 is associated with an input device for receiving inputs and/or an output device for presenting data to one or more users.

The web server 110 and/or at least one of the devices 102-104 can include a computer program (e.g., a mobile software application, etc.) installed thereon for performing one or more operations as described herein. In some embodiments, the web server 110 and/or at least one of the devices 102-104 include a logic/module for performing one or more operations as described herein. Such a logic/module can be implemented as at least one of hardware (e.g., electronic circuitry of the processing unit(s), dedicated logic, etc.), software (e.g., one or more instructions associated with a computer program executed by the processing unit(s), software run on a general-purpose computer system or a dedicated machine, etc.), or a combination thereof. Processing units include, but are not limited to, an application specific integrated circuit (ASIC), an application-specific instruction set processor (ASIP), a field programmable gate array (FPGA), a digital signal processor (DSP), any type of processor, an embedded processor, a co-processor, or any other type of logic capable of processing instructions.

In some embodiments, the database 111 comprises an aggregation of data, including one or more files that each include one or more records or one or more tables of records. The database 111 can, in some embodiments, be a general data structure that is implemented in a storage space (e.g., a hard disc or memory) of a computer system (e.g., web server 110, another computer system, etc.) by using a database management program (DBMS).

FIG. 1 includes one or more communication networks 101, which may comprise one or more different types of communication networks, such as the Internet, enterprise networks, data centers, fiber networks, storage networks, WANs, and/or LANs. The communication networks 101 individually, or in combination, may provide wired and/or wireless connections between the web server 110 and/or at least one of the devices 102-104 that operate in the electrical and/or optical domain, and also employ any number of network communication protocols (e.g., TCP/IP). For example, one or more of the communication networks 101 may be a wireless fidelity (Wi-Fi®) network, a Bluetooth® network, a Zigbee® network, and/or any other suitable radio based network as would be appreciated by one of ordinary skill in the art upon viewing this disclosure. It is to be appreciated by those having ordinary skill in the art that the communication network(s) 101 may also include any required networking hardware, such as network nodes that are configured to transport data over communication network 101. Examples of network nodes include, but are not limited to, switches, gateways, routers, network bridges, modems, wireless access points, networking cables, line drivers, switches, hubs, and repeaters.

One or more of the communication networks 101 may be configured to implement computer virtualization, such as virtual private network (VPN) and/or cloud based networking. For one embodiment, the web server 110 and/or at least one of the devices 102-104 comprise a plurality of virtual machines (VMs), containers, and/or other types of virtualized computing systems for processing computing instructions and transmitting and/or receiving data over communication network(s) 101. Furthermore, the web server 110 and/or at least one of the devices 102-104 may be configured to support a multi-tenant architecture, where each tenant may implement its own secure and isolated virtual network environment. Although not illustrated in FIG. 1, the web server 110 and/or at least one of the devices 102-104 may be configured to connect to a variety of other types of programmable devices, such as VMs, containers, hosts, storage devices, wearable devices, mobile devices, and/or any other device configured to transmit and/or receive data using wired or wireless communication networks 101.

Figure 2:
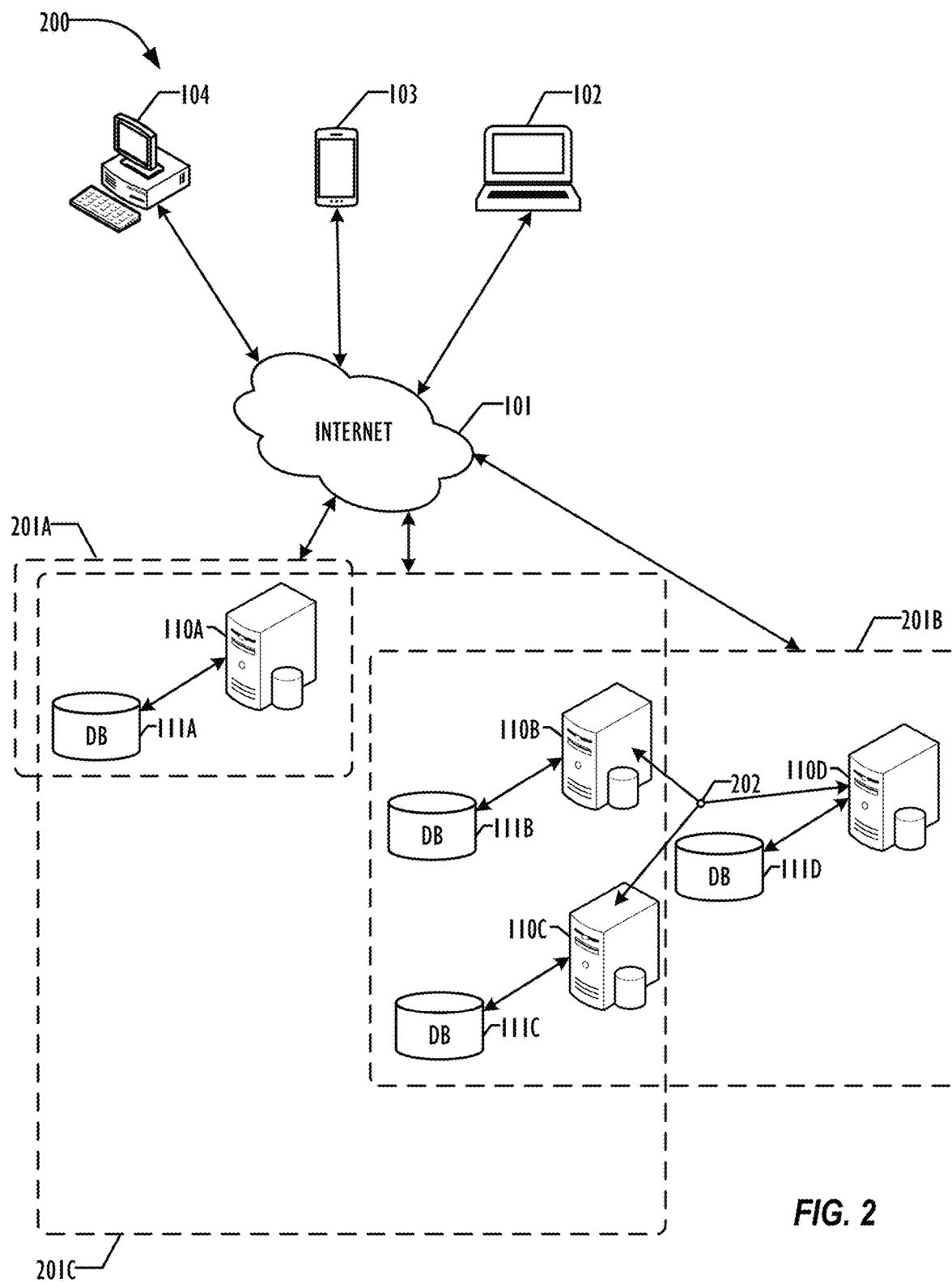
FIG. 2 is a pictorial diagram of an Internet-based web server system comprising multiple clusters and multiple nodes, according to one or more embodiments disclosed herein.

Turning now to FIG. 2, a pictorial diagram of an Internet-based web server system 200 comprising multiple clusters and multiple nodes is illustrated, according to one or more embodiments disclosed herein. FIG. 2 includes the programmable devices 102-104 of FIG. 1 and a node including a server 110A and a database 111A that correspond to the server 110 and the database 111A of FIG. 1, respectively. FIG. 2 further includes additional nodes that may, e.g., maintain a synchronized version of database 111A that is in communication with webserver 110A. As shown in FIG. 2, the additional 'synchronized' nodes include: server 110B/database 111B; server 110C/database 111C; and server 110D/database 111D. A communication link 202 is shown as connecting each of the following nodes: server 110B/database 111B; server 110C/database 111C; and server 110D/database 111D into cluster 201B. The single server 110A/database 111A may also be logically grouped as an independent cluster 201A. In still other embodiments, clusters, such as cluster 201C, may comprise nodes that are part of two or more other independent clusters and/or located at two or more different data centers, e.g., server 110A/database 111A; server 110B/database 111B; and server 110C/database 111C may be logically grouped into the cluster 201C. As will be described in greater detail below, the techniques disclosed herein also allow for the performance of consistency verification on clusters of nodes (in potentially different data centers) by applying the NS-Tree indexes at a 'federated' level.

Figure 3:
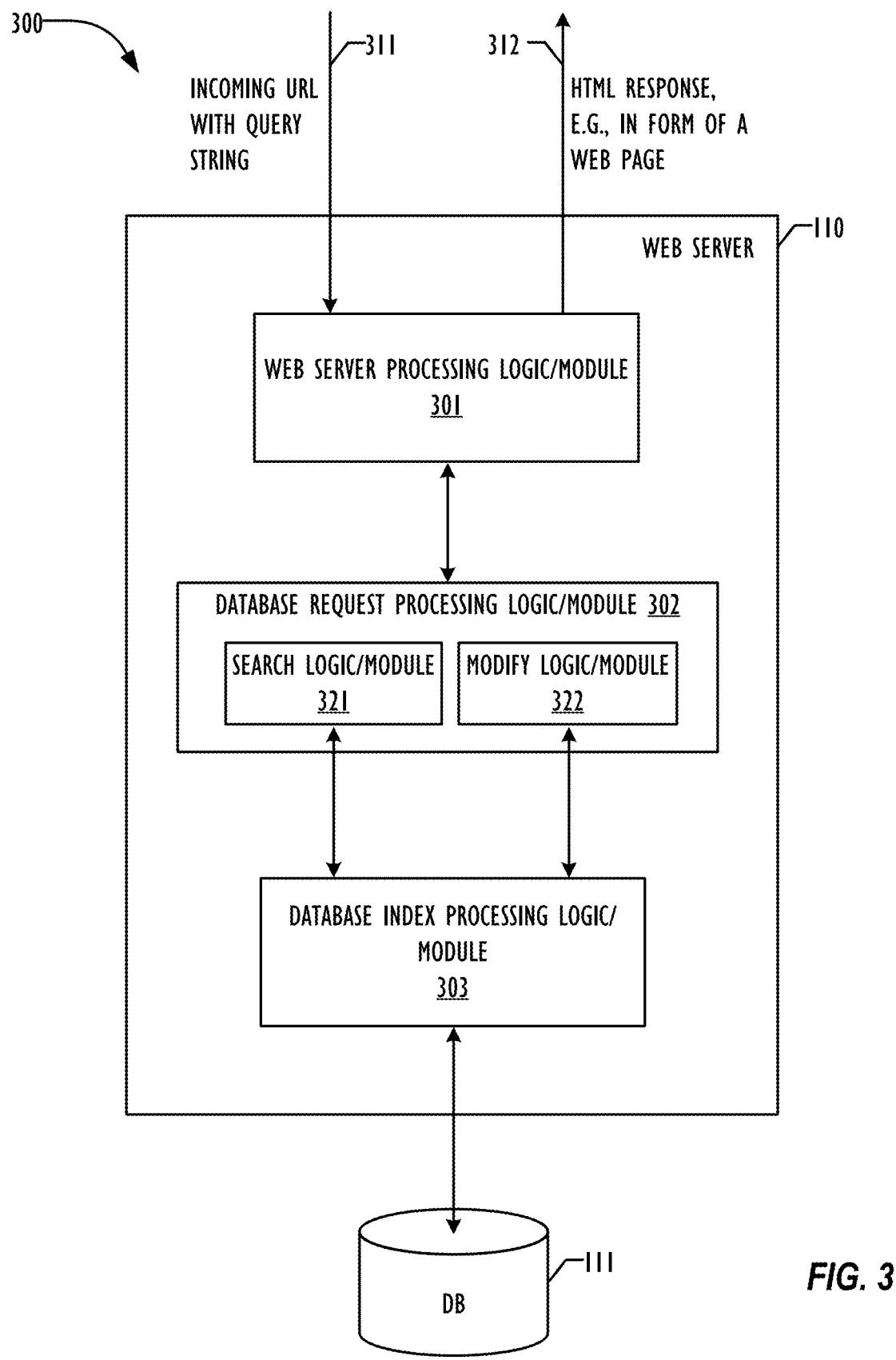
FIG. 3 is a block diagram of a web server computing system including an improved database, according to one or more embodiments disclosed herein.

Turning now to FIG. 3, a block diagram of a web server computing system including an improved database is illustrated, according to one or more embodiments disclosed herein. The web server computing system 300 may include the web server 110 and the database 111 of FIG. 1. The web servers 110A-110D and the databases 111A-111D of FIG. 2 may include analogous components and function similarly to the web server 110 and the database 111, respectively. In the illustrated example, the web server 110 can include a plurality of processing logic/processing modules. Each of these logic/modules can be implemented as at least one of hardware (e.g., electronic circuitry of the processing unit(s), dedicated logic, etc.), software (e.g., one or more instructions associated with a computer program executed by the processing unit(s), software run on a general-purpose computer system or a dedicated machine, etc.), or a combination thereof. Processing units include, but are not limited to, an application specific integrated circuit (ASIC), an application-specific instruction set processor (ASIP), a field programmable gate array (FPGA), a digital signal processor (DSP), any type of processor, an embedded processor, a co-processor, or any other type of logic capable of processing instructions.

The logic/modules in FIG. 3 can, for some embodiments, be used to receive a request 311 from users over the communication network(s) 101 and to generate a result 312 that is formatted in a specific manner (e.g., in HTML, etc.) and transmitted back to a user. In the illustrated example, these processing logic/modules include a web server processing logic/module 301, a database request processing logic/module 302, and a database index processing logic/module 303. The web server processing logic/module 301 receives the request 311 (e.g., an HTTP request, etc.) from a user and performs all the necessary processing needed to generate a database request that is to be applied to database 111. This request is then passed to a database request processing logic/module 302, in which the request is further processed for application against database 111. A part of this processing of the request may include processing within a database index processing logic/module 303. In the index processing logic/module 303, portions of the request may be applied to the database using previously generated indexes, e.g., N-Tree indexes or NS-Tree indexes. The indexes may be used to organize and arrange the data within fields and database records in some form of a sequential order. Processing logic/module 303 retrieves and stores various database records within database 111 as necessary.

The processing logic/modules 301-303 generate database requests based on each HTTP request received from a user. The processing logic/module 301-303 simultaneously processes the plurality of such HTTP requests, and thus, the web server processing logic/modules 301-303 operating in a multi-threaded environment permits multiple requests of the database to occur simultaneously. These processing logic/modules 301-303 also handle conflict detection and resolution processing to permit the simultaneous reading of the database 111 while the database 111 may also be modified by a write request.

The database request processing logic/module 302 may also include a search logic/module 321 and a modify logic/module 322. The search logic/module 321 performs the processing associated with attempting to locate a request received from a user with data stored within a field in the database. This search logic/module 321 interacts with any indices, e.g., B*Tree indices, that are used to assist in the searching of the database. Similarly, the modify logic/module 322 processes write requests that alter, add, and delete data stored within database 111. These changes are also reflected within data entries within any related indices that assist in the searching of the database fields.

Figure 4:
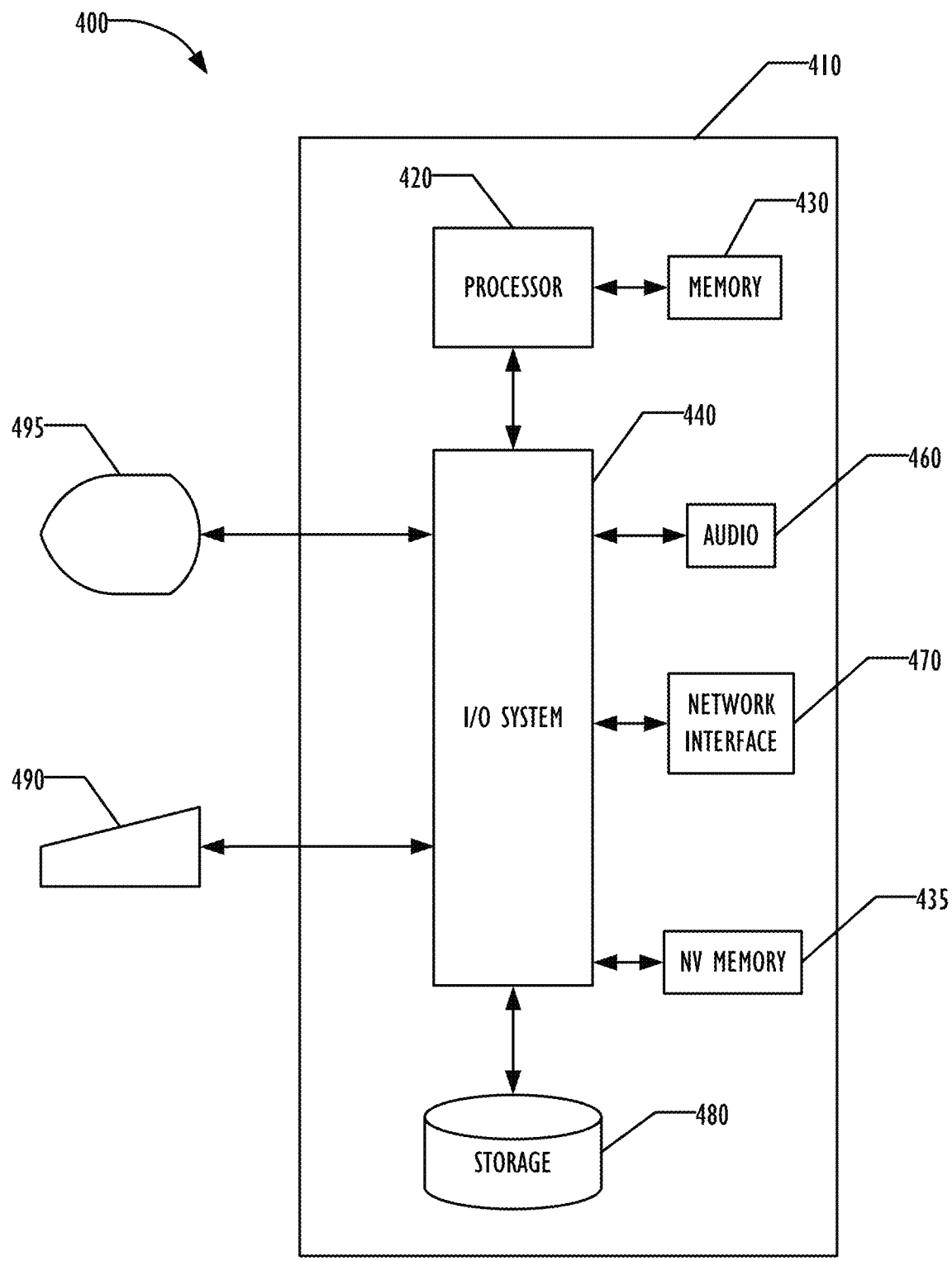
FIG. 4 is a block diagram illustrating a computer system for utilizing improved aggregate indexes for real-time verification of node contents, according to one or more embodiments disclosed herein.

FIG. 4 is a block diagram illustrating a computer system 400 that may be used to implement some or all of the techniques described herein. The computer system may 400 may correspond to the web server 110, one of the web servers 110A-D, the database 111, one of the databases 111A-D, or a combination thereof. A system unit 410 provides a location where components of the computer system 400 may be mounted or otherwise disposed. The system unit 410 may be manufactured as a motherboard on which various chipsets are mounted, providing electrical connection between the components and signal and power distribution throughout the system unit 410 and external to the system unit 410 as desired. For example, the computer system 400 may include an output device such as display 495, which provides a way to display alerts or other query results related to node synchronization and verification.

Figure 6:
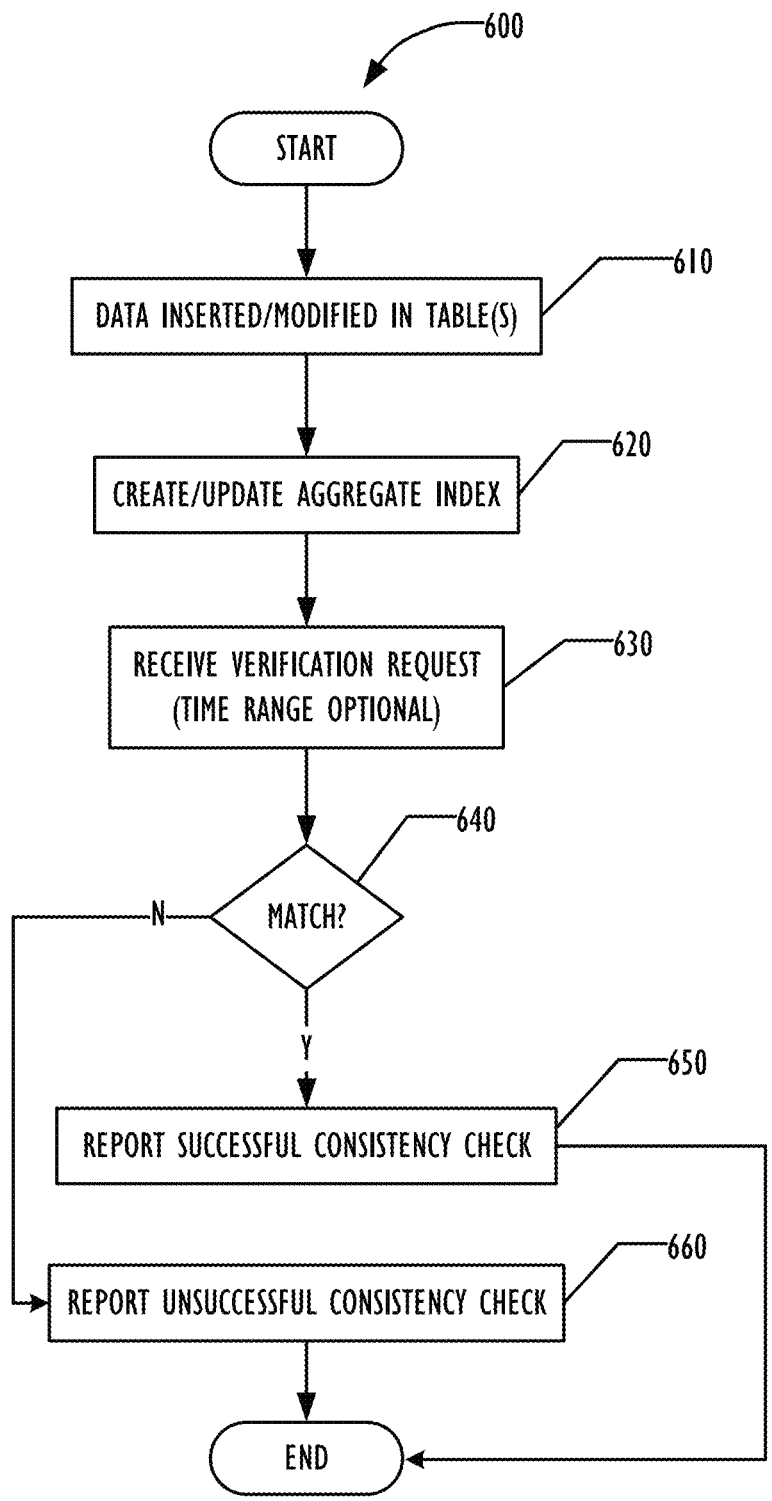
FIG. 6 is a flowchart illustrating a technique for utilizing improved aggregate indexes for real-time verification of node contents, according to one or more embodiments disclosed herein.

Various components of the system unit 410 may include one or more processor 420, typically each a single processor chip mounted in a mounting socket (not shown in FIG. 4) to provide electrical connectivity between the processors 420 and other components of the computer system 400. Although a single processor 420 is illustrated in FIG. 4, any desired number of processors can be used, each of which may be a multi-core processor. Multiple processor chips are available on the market currently, and any desired processor chip or chipset may be used. The system unit 410 may be programmed to perform methods in accordance with this disclosure, an example of which is illustrated in FIG. 6.

The processor 420 is connected to memory 430 for use by the processor 420, typically using a link for signal transport that may be a bus or any other type of interconnect, including point-to-point interconnects. The memory 430 may include one or more memory modules and comprise random access memory (RAM), read only memory (ROM), programmable read only memory (PROM), programmable read-write memory, and solid-state memory. The processor 420 may also include internal memory, such as cache memory. An operating system running on the processor 420 generally controls the operation of the computer system 400, providing an operating system environment for services, applications, and other software to execute on the computer 400.

As illustrated in FIG. 4, processor 420 is also connected to a I/O subsystem 440 that provides I/O, timer, and other useful capabilities for the computer system 400. For example, the I/O subsystem 440 may provide I/O ports for connecting an optional display 495 and an optional input device 490, such as a keyboard, mouse, touch screen, to the system unit 410. The ports may be either one or more of special-purpose ports for components like the display 495 or multipurpose ports such as Universal Serial Bus (USB) ports for connecting the input device 490. The I/O subsystem 440 may also include an interface for communicating with storage devices such as storage device 480, connect to audio devices through an audio interface 460, and connect to the communication network 101 via network interface 470. The storage device 480 represents any form of non-volatile storage including, but not limited to, all forms of optical and magnetic, including solid-state storage elements, including removable media, and may be included within system unit 410 or be external to system unit 410. Storage device 480 may be a program storage device used for storage of software to control computer 400, data for use by the computer system 400 (including network flow data), or both. Although only a single storage device 480 is illustrated in FIG. 4 for clarity, any number of storage devices 480 may be provided as desired, depending on interface availability. The I/O subsystem 440 may be implemented as one or more chips within the system unit 410. In some embodiments, the memory 430 may be connected to the I/O subsystem 440 instead of to the processor 420.

The computer system 400 may be any type of computing device, such as, for example, a smart phone, smart tablet, personal digital assistant (PDA), mobile Internet device (MID), convertible tablet, notebook computer, desktop computer, server, or smart television. The display 495, if present, may be any time of device for presenting an interface to the user, such as, for example, a touch screen or a liquid crystal display. The elements illustrated in FIG. 4 are illustrative and given by way of example only. The elements shown in FIG. 4 may be combined or divided into multiple elements as desired. Other elements, such as geo-positioning logic provided by a Global Positioning System (GPS) transceiver, as well as logic for handling mobile communications using standards such as, for example, IEEE 802.11, IEEE 802.16, WiMax, etc., may also be provided as desired.

Figure 5:
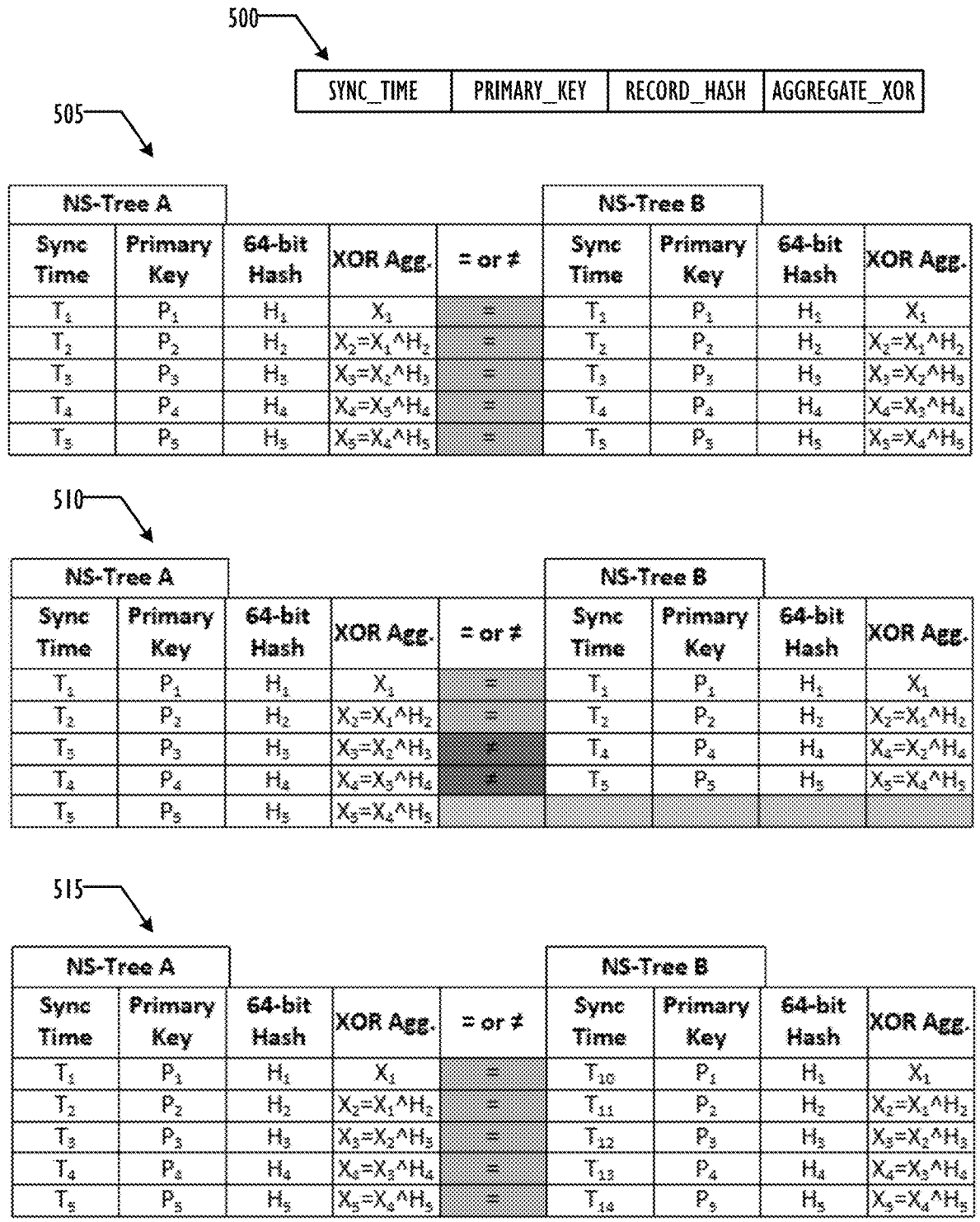
FIG. 5 is a set of exemplary tables utilizing improved aggregate indexes for real-time verification of node contents, according to one or more embodiments disclosed herein.

Turning now to FIG. 5, a set of exemplary tables utilizing improved aggregate indexes for real-time verification of node contents are illustrated, according to one or more embodiments disclosed herein. According to some embodiments, NS-Tree indexes comprise a specialized form of index entry having a composition that is uniquely architected to validate consistency between the data of two separate tables based on the same schema. The composition of the NS-Tree index entry may, e.g., be: a sync time, a primary key, a record hash, and an aggregate accumulated value.

Each element of the exemplary NS-Tree index (500) referred to above will now be described in greater detail:

"SyncTime": The time (e.g., the last modified time) associated with the record associated with the index entry 500. In some embodiments, the SyncTime may be a 4-byte value.

"Primary Key": The primary key value of the record (or the auto-increment field, if it exists). If this field of the index entry corresponds to an auto-increment field, a system or user may separately ensure that field values of NS-tree indexes are consistent across nodes/shards. According to some embodiments, a table must have a primary key in order to be synchronized.

"Record Hash": The record hash is the hash of the record. In some implementations, all fields may be included by default in the record's hash (with the exception of the SyncTime and/or the auto-increment fields, if the auto-increment fields are not the primary key chosen for the Primary Key field). Individual fields of the record may be excluded from the hash, e.g., as specified through an application programming interface (API) by the user. According to some embodiments, the record hash may be a 64-bit or 128-bit value.

"Aggregate": The aggregate value is a running, accumulated value reflective of the hashes of each entry in the NS-Tree index up to the NS-Tree index entry 500. In some embodiments, the Aggregate field may comprise an 'XOR Aggregate' field, i.e., the result of XOR'ing all the hashes of the entries in the NS-Tree index up to the point in question.

An NS-Tree may be created and/or maintained when, e.g.: 1.) an API requests the system to build the NS-Tree; 2.) an SQL statement is executed against the NS-Tree; 3.) an API requests to determine if two (or more) tables are synchronized; or 4.) an API requests that two (or more) tables be synchronized.

As records are inserted into the database, the NS-Tree index may be maintained, along with any other pre-defined table indexes. The sync time of the record (i.e., the first columns in the NS-Trees A and B of table 505) may be determined by the database at the time of write (or at the time of record creation) on a client. This ensures relative record position within the NS-Tree and allows for complex consistency validation queries to be executed against multiple tables, nodes, or shards.

The primary key (i.e., the second columns in the NS-Tree indexes A and B of table 505) may be used for record validation as well as positional awareness with in the NS-Tree index. A hash of the record may then be created and stored in the index entry (i.e., the third columns in the NS-Trees A and B of table 505), and an additional value may then be calculated, which may be used in the Aggregate section of the index entry (i.e., the fourth columns in the NS-Trees A and B of table 505). According to some embodiments of NS-Trees, the Aggregate value may be calculated by XOR-ing the hash of the record stored in the current index entry with the previous record's XOR calculation. These values may then be calculated and maintained in real-time as index entries are inserted, deleted, and/or modified. Inconsistencies between data tables indexed by NS-Tree indexes (e.g., NS-Tree A and NS-Tree B in table 505) may then be easily detected in the NS-Tree indexes, as shown, e.g., in the fifth column of table 505 in FIG. 5, which is labeled "= or ≠". In table 505, the aggregate value of each of the index entries of NS-Tree A matches the aggregate value of the corresponding index entry of NS-Tree B, so the system may verify that the relevant data stored in the tables A and B is currently consistent. It should be noted that corresponding index entries having matching aggregate values indicates both that the records of the corresponding indexes are consistent and that all records corresponding to previous indexes are consistent. Accordingly, the system may determine that the table A is consistent with the table B up to a particular pair of records by performing a single comparison of index entries in a position corresponding to the particular pair of records. To illustrate, the system may determine that table A is consistent with table B by performing a single comparison of the index entries in a last (e.g., Ts) of the NS-Trees A and B.

By contrast, table 510 in FIG. 5 shows two NS-Trees A and B that are out of synchronization, based on the accumulated XOR value (e.g., the third and fourth row entries of the tables are not equal). In tables 505 and 510, the consistency between NS-Tree A and NS-Tree B can easily be determined by simply comparing the XOR aggregate values at a last position (e.g., Ts) of each tree. Using the various indexing and aggregate accumulation capabilities described above, the XOR aggregate may be dynamically maintained, regardless of whether record entries are being added, modified, or deleted. In other words, there is no need for a reconstruction of the NS-Tree with each addition, modification, and/or deletion.

Tables that are checked for consistency are frequently in a 'dirty' or ever-changing state. Many applications, e.g., 'Big Data' application, may require regular validation of consistency between tables/relations. Time-series applications, for example, insert data in a monotonically increasing fashion. Ensuring the consistency of the data in real-time in such applications may be inaccurate, e.g., due to the varying times of insertion of the data. However, NS-Trees are capable of validating consistency based on time. For example, a user may specify a start time or a sub-time range where consistency validation is desired. This allows for scaled systems to reach eventual consistency and then be checked for data integrity between relations.

In Table 505, for example, consistency may be validated at any time within the NS-tree indexes A and B. The sync time in each index entry in the NS-Tree maybe queried, as any index in the database and exact positions can be readily identified. The sync time value in each NS-Tree entry may then be used to ensure the relative position of every entry within the tree.

Table 515 is an example of ensuring consistency with varying sync times between trees. Notice that the sync times in table 515 are not consistent between the two NS-Trees A and B in this example. The consistency checking process may be used to normalize the sync times between the trees, and the primary key may be used to determine relative positions of index entries within the NS-Trees. The XOR aggregate values may then be used at any point within the tree to ensure consistency between NS-Trees. This also allows for relations of varying sizes to ensure data consistency between subsets of the relations.

The NS-Tree embodiments described above may be applied to various types of tables, such as dimension tables and "data partitioned" tables (i.e., data tables partitioned by a field value or time). A system may maintain a single NS-Tree per dimension partitioned table and perform consistency validation checks, as explained above. By contrast, the system may maintain a separate NS-Tree index for each data partition of a data partitioned table. The NS-Tree indexes of the partitions may overlap in terms of the partitioning value (e.g., index the same fields and/or times).

Since relative position may be used in the NS-Tree to determine primary key and hash validation, the consistency algorithm may generate a "virtual NS-Tree," that is, a single NS-Tree that acts as a single tree in order to perform consistency checks between two NS-Trees that are actually comprised of any number of partitions in any configuration. The creation of this virtual NS-Tree may be done dynamically and may adhere to the rules of entire tree validation or sub-tree validation (e.g., by specific sync time or time range), as described above.

Due to the contained nature of NS-Trees, consistency validation does not need to be isolated to separate nodes existing within a single data center. Indeed, these techniques may be applied across data centers that require data consistency validation and replication. Further, due to the unique nature of the NS-Tree indexes, there is no appreciable degradation in performance or efficiency as the amount of data increases.

FIG. 6 shows a flowchart 600 illustrating a technique for utilizing improved aggregate indexes for real-time verification of node contents, according to one or more embodiments disclosed herein. In block 610 of FIG. 6, data is inserted and/or modified into one or more tables in a node being monitored by the techniques described herein. The data may be stored in accordance with any desired data storage protocol. The collected data may be stored in the memory 430, on storage device 480, or elsewhere on or outboard of the system unit 410, including transmission from the computer 400 to an external device, e.g., a database 111.

In block 620, the NS-Tree index, e.g., as described in detail above, may be created and/or updated for each respective table, based on the insertion or modification of data referred to above in block 610. As mentioned above, the NS-Tree has the advantageous property that it may be scaled across the data shards and nodes of a distributed data management solution, while still maintaining the ability to validate consistency at any given moment and across any range of time.

In block 630, a verification request is received at one or more of the nodes of the system. In some such requests, a time range may be specified over which the user desires to know if two or more data sources are consistent. In other such requests, a user may desire to know if two or more data sources are consistent in their entireties (i.e., without respect to any specific sub-time interval).

In block 640, if the verification request finds a match between the data nodes being validated for consistency (over the requested time period), the process may proceed to block 650, wherein a successful consistency check is nearly immediately reported back to the user. If, instead, at block 640, the verification request finds that there is a mismatch between the data nodes being validated for consistency (over the requested time period), the process may proceed to block 660, wherein an unsuccessful consistency check is nearly immediately reported back to the user. After reporting back the status of the consistency verification check, the process may end.

For one or more embodiments of an NS-Tree (and the corresponding techniques associated with the NS-Trees), the NS-Trees can be implemented as part of database management system. A non-limiting example of a database management system is included in the McAfee® Security Information & Event Management (SIEM) solution.

Program instructions may be used to cause a general-purpose or special-purpose processing system that is programmed with the instructions to perform one or more of the operations described herein. Alternatively, the operations may be performed by specific hardware components that contain hardwired logic for performing the operations, or by any combination of programmed computer components and custom hardware components. The methods described herein may be provided as a computer program product that may include a machine-readable medium having stored thereon instructions that may be used to program a processing system or other device to perform the methods. The term "computer readable medium" used herein shall include any medium that is capable of storing or encoding a sequence of instructions for execution by the machine and that cause the machine to perform any one of the methods described herein. The term "computer readable medium" shall accordingly include, but not be limited to, tangible, non-transitory memories such as solid-state memories, optical and magnetic disks. Furthermore, it is common in the art to speak of software, in one form or another (e.g., program, procedure, process, application, module, logic, and so on) as taking an action or causing a result. Such expressions are merely a shorthand way of stating that the execution of the software by a processing system causes the processor to perform an action or produce a result.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

MCAFEE® is a registered trademark of McAfee LLC. These and any other marks referenced herein may be common law or registered trademarks of third parties affiliated or unaffiliated with the applicant or the assignee. Use of these marks is by way of example and shall not be construed as descriptive or to limit the scope of the embodiments described herein to material associated only with such marks.

EXAMPLES

The following examples pertain to further embodiments.

Example 1 is a computer system, comprising: a memory; and one or more processors communicatively coupled to the memory wherein, the memory comprises instructions stored therein to cause the one or more processors to perform a computer implemented method of node verification, the method comprising: inserting a first record into a first table of a first node, wherein the first table has a first schema; creating a first index for the first record in the first table, wherein the first index comprises: a first time value associated with the first record; a primary key for the first record; a first hash value of the first record; and an aggregate value associated with the first record; comparing a first set of records from the first table with a second set of records from a second table, wherein the first set of records comprises the first record, and wherein the second table has the first schema; and verifying whether the first set of records are consistent with the second set of records based, at least in part, on a comparison of the created first index with a corresponding index created for the second table.

Example 2 comprises the subject matter of example 1, wherein verifying whether the first set of records are consistent with the second set of records comprises verifying whether the first set of records are consistent with the second set of records over a first period of time.

Example 3 comprises the subject matter of example 1, wherein verifying whether the first set of records are consistent with the second set of records comprises verifying whether the first set of records are consistent with the second set of records at a first moment in time.

Example 4 comprises the subject matter of example 1, wherein the second table is on a second node.

Example 5 comprises the subject matter of example 4, wherein the first node is part of a first cluster and the second node is part of a second cluster.

Example 6 comprises the subject matter of example 5, wherein the first cluster and the second cluster are independent of one another.

Example 7 comprises the subject matter of example 1, wherein the aggregated value comprises an accumulated XOR value.

Example 8 is a computer-implemented method, comprising: inserting a first record into a first table of a first node, wherein the first table has a first schema; creating a first index for the first record in the first table, wherein the first index comprises: a first time value associated with the first record; a primary key for the first record; a first hash value of the first record; and an aggregate value associated with the first record; comparing a first set of records from the first table with a second set of records from a second table, wherein the first set of records comprises the first record, and wherein the second table has the first schema; and verifying whether the first set of records are consistent with the second set of records based, at least in part, on a comparison of the created first index with a corresponding index created for the second table.

Example 9 comprises the subject matter of example 8, wherein verifying whether the first set of records are consistent with the second set of records comprises verifying whether the first set of records are consistent with the second set of records over a first period of time.

Example 10 comprises the subject matter of example 8, wherein verifying whether the first set of records are consistent with the second set of records comprises verifying whether the first set of records are consistent with the second set of records at a first moment in time.

Example 11 comprises the subject matter of example 8, wherein the second table is on a second node.

Example 12 comprises the subject matter of example 11, wherein the first node is part of a first cluster and the second node is part of a second cluster.

Example 13 comprises the subject matter of example 12, wherein the first cluster and the second cluster are independent of one another.

Example 14 comprises the subject matter of example 8, wherein the aggregated value comprises an accumulated XOR value.

Example 15 is a non-transitory computer readable medium comprising computer executable instructions stored thereon to cause one or more processing units to: insert a first record into a first table of a first node, wherein the first table has a first schema; create a first index for the first record in the first table, wherein the first index comprises: a first time value associated with the first record; a primary key for the first record; a first hash value of the first record; and an aggregate value associated with the first record; compare a first set of records from the first table with a second set of records from a second table, wherein the first set of records comprises the first record, and wherein the second table has the first schema; and verify whether the first set of records are consistent with the second set of records based, at least in part, on a comparison of the created first index with a corresponding index created for the second table.

Example 16 comprises the subject matter of example 15, wherein the instructions to verify whether the first set of records are consistent with the second set of records comprise instructions to verify whether the first set of records are consistent with the second set of records over a first period of time or at a first moment in time.

Example 17 comprises the subject matter of example 15, wherein the second table is on a second node.

Example 18 comprises the subject matter of example 17, wherein the first node is part of a first cluster and the second node is part of a second cluster.

Example 19 comprises the subject matter of example 18, wherein the first cluster and the second cluster are independent of one another.

Example 20 comprises the subject matter of example 15, wherein the aggregated value comprises an accumulated XOR value.

What is claimed is:

1. A computer system, comprising:
   memory; and
   one or more processors communicatively coupled to the memory, the memory including instructions that, when executed, cause the one or more processors to at least:
   create a first index for a first table having a plurality of records, the first index to include a first index entry corresponding to a first record of the first table, the first index entry to include a first hash value of the first record in the first table and a first accumulated aggregate value, the first accumulated aggregate value based on an accumulated combination of respective hash values included in corresponding other entries that precede the first index entry in the first index; and
   verify whether the plurality of records of the first table are consistent with a plurality of records of a second table by comparing the first accumulated aggregate value of the first index to a second accumulated aggregate value of a second index created for the second table.

2. The computer system of claim 1, wherein the first table is stored on a first node of a computer network and the second table is stored on a second node of the computer network.

3. The computer system of claim 2, wherein the computer network includes a first cluster of nodes and a second cluster of nodes, and the first node is part of first cluster of nodes and the second node is part of the second cluster.

4. The computer system of claim 3, wherein the first cluster and the second cluster operate independently of one another, and the plurality of records of the first table can be modified independently of the plurality of records of the second table.

5. The computer system of claim 1, wherein the first accumulated aggregate value is generated using an XOR operation.

6. The computer system of claim 1, wherein the entries of the first index, including the first entry and the other entries, are ordered.

7. The computer system of claim 1, wherein the first accumulated aggregate value and the second accumulated aggregate value are associated with a same time.

8. A computer-implemented method, comprising:
   creating a first index entry for a first index having a plurality of index entries, the first index entry corresponding to a first record of a first database having records, the first index entry to include a first hash value of the first record and a first accumulated aggregate value, the first accumulated aggregate value based on a plurality of an accumulated aggregate combination of a plurality of hash values corresponding to other ones of the plurality of index entries that precede the first index entry in the first index; and
   verifying whether the plurality of records of the first database are consistent with a plurality of records of a second database based, at least in part, on a comparison of the first accumulated aggregate value of the first index entry to a second accumulated aggregate value of a second index entry of a second index, the second index entry corresponding to a second record of the second database.

9. The method of claim 8, wherein verifying whether the plurality of records of the first database are consistent with the plurality of records of the second database includes verifying whether the plurality of records of the first database are consistent with the plurality of records of the second database over a first period of time.

10. The method of claim 8, wherein the first database is on a first node of a network of computers, the second database is on a second node of the network of computers, and operations performed on the first database cause the records of the first database and the records of the second database to be inconsistent.

11. The method of claim 10, wherein the first node is part of a first cluster and the second node is part of a second cluster and the first and second clusters operate independently of one another.

12. The method of claim 8, wherein the first accumulated aggregate value is generated using an XOR operation.

13. The computer implemented method of claim 8, wherein the index entries of the plurality of index entries are ordered.

14. A non-transitory computer readable medium comprising computer executable instructions that, when executed, cause one or more processors to:
   generate a first hash value of a first record of a plurality of records of a first database to include in an entry of a first index of the first database;
   generate a first accumulated aggregate value to include in the entry of the first index, the first accumulated aggregate value based on an accumulated combination of a plurality of hash values included in corresponding other entries of the first index that precede the first index entry in the first index; and
   determine whether the plurality of records of the first database are consistent with a plurality of records of a second database based, at least in part, on a comparison of the first accumulated aggregate value of the first index and a second accumulated aggregate value of a second index of the second database.

15. The non-transitory computer readable medium of claim 14, wherein the instructions cause the one or more processors to verify whether the first set of records are consistent with the second set of records over a first period of time or at a first moment in time.

16. The non-transitory computer readable medium of claim 14, wherein the second database is on a second node.

17. The non-transitory computer readable medium of claim 16, wherein the first node is part of a first cluster and the second node is part of a second cluster.

18. The non-transitory computer readable medium of claim 17, wherein the first cluster and the second cluster are independent of one another.

19. The non-transitory computer readable medium of claim 14, wherein the first accumulated aggregate value includes an accumulated XOR value.

* * * * *